US008847984B2

(12) United States Patent
Boorman et al.

(10) Patent No.: US 8,847,984 B2
(45) Date of Patent: Sep. 30, 2014

(54) SYSTEM AND METHOD FOR FORMING A COMPOSITE IMAGE IN A PORTABLE COMPUTING DEVICE HAVING A DUAL SCREEN DISPLAY

(75) Inventors: Mollie Boorman, Calabasas, CA (US); Amy Kalson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 834 days.

(21) Appl. No.: 12/510,181

(22) Filed: Jul. 27, 2009

(65) Prior Publication Data

US 2011/0018901 A1     Jan. 27, 2011

(51) Int. Cl.
G09G 5/00      (2006.01)
G06T 1/00      (2006.01)
(52) U.S. Cl.
CPC ........................................ *G06T 1/00* (2013.01)
USPC ................................................. 345/629; 345/6
(58) Field of Classification Search
USPC ........................................ 345/6, 629, 418, 4
See application file for complete search history.

(56) References Cited

U.S. PATENT DOCUMENTS

| 4,204,207 | A | 5/1980 | Bakula et al. |
| 4,204,208 | A | 5/1980 | McCarthy |
| 4,609,253 | A | 9/1986 | Perisic |
| 5,061,061 | A | 10/1991 | Robley et al. |
| 5,329,323 | A | 7/1994 | Biles |
| 5,469,295 | A | 11/1995 | Burke |
| 5,528,425 | A | 6/1996 | Beaver |
| 5,841,431 | A | 11/1998 | Simmers |
| 6,072,476 | A | 6/2000 | Harada et al. |
| 6,135,884 | A | 10/2000 | Hedrick et al. |
| 6,290,359 | B1 | 9/2001 | Shriver |
| 6,315,666 | B1 | 11/2001 | Mastera et al. |
| 6,341,868 | B1 | 1/2002 | Shriver |
| 6,368,216 | B1 | 4/2002 | Hedrick et al. |
| 6,486,890 | B1 | 11/2002 | Harada et al. |
| 6,504,649 | B1 | 1/2003 | Myers |
| 6,703,988 | B1 * | 3/2004 | Fergason ........................ 345/6 |
| 6,780,105 | B1 | 8/2004 | Kaminkow |
| 6,906,762 | B1 | 6/2005 | Witehira et al. |
| 7,030,552 | B2 | 4/2006 | Chao et al. |
| 7,075,597 | B2 | 7/2006 | Wen et al. |
| 7,221,330 | B2 | 5/2007 | Finke-Anlauff |
| 7,221,506 | B1 | 5/2007 | Schlosser |
| 7,259,747 | B2 | 8/2007 | Bell |
| 7,307,675 | B2 | 12/2007 | Abileah |
| 7,348,963 | B2 | 3/2008 | Bell |
| 7,352,424 | B2 | 4/2008 | Searle |
| 7,470,186 | B2 | 12/2008 | Cannon |
| 7,505,049 | B2 | 3/2009 | Engel |
| 7,629,959 | B2 * | 12/2009 | Kitaura ........................ 345/629 |
| 7,656,399 | B2 * | 2/2010 | Ono ........................ 345/629 |
| 2002/0008675 | A1 * | 1/2002 | Mayer et al. ........................ 345/4 |
| 2007/0013718 | A1 * | 1/2007 | Ohba ........................ 345/629 |
| 2007/0176848 | A1 * | 8/2007 | Ferren et al. ........................ 345/6 |
| 2011/0181621 | A1 * | 7/2011 | Ohba et al. ........................ 345/629 |

OTHER PUBLICATIONS

Pepper's Ghost, Wikipedia dated Oct. 23, 2009.
Schüfftan Process, Wikipedia dated Oct. 23, 2009.
NVIDIA CUDA: Naked-Eye Stereoscopic System for Real-Time Medical Imaging dated Oct. 23, 2009.
Planar: The Next Generation of Stereoscopic Displays, www. Planar3d.com dated Oct. 23, 2009.

* cited by examiner

*Primary Examiner* — Chante Harrison
(74) *Attorney, Agent, or Firm* — Ference & Associates LLC

(57) ABSTRACT

A system and method for forming a composite image from a secondary image reflected on to the display of a primary image is disclosed. Furthermore, applications for using the composite image in a video gaming context are disclosed.

39 Claims, 19 Drawing Sheets

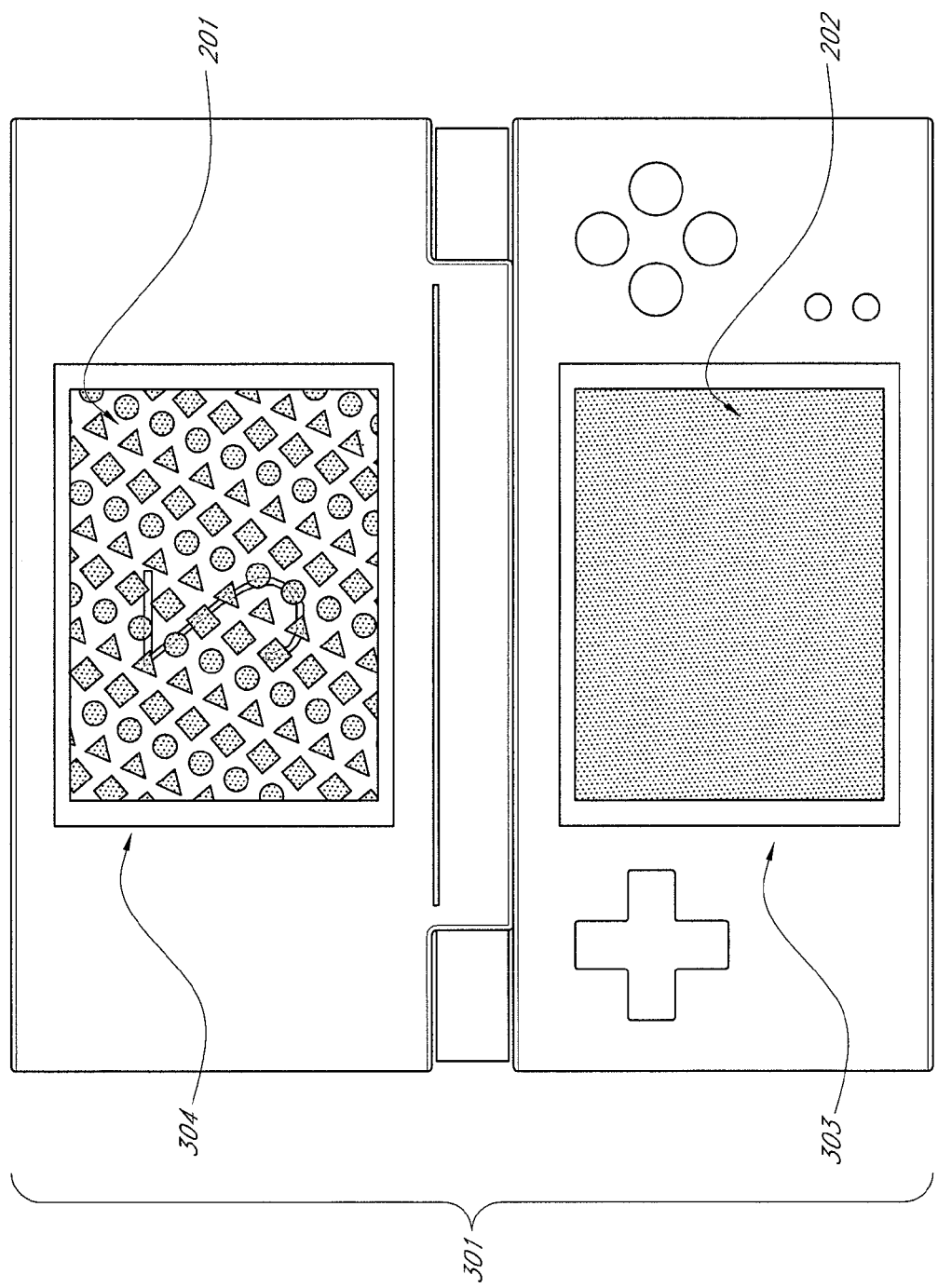

SYSTEM AND METHOD FOR FORMING A COMPOSITE IMAGE IN A PORTABLE COMPUTING DEVICE HAVING A DUAL SCREEN DISPLAY

BACKGROUND OF THE INVENTION

1. Field of the Invention

The technology relates to the field of video game and entertainment systems, and more specifically to an interactive computing system that generates a composite image based on the reflection of an image from one display onto another image on a proximate display.

2. Description of the Related Technology

Computing systems with multiple displays or monitors are now widely used. In particular, systems in the Nintendo DS™ family of products are clamshell devices with one display area on the internal side of the top half of the clamshell and another display area on the internal side of the bottom half of the clamshell. Another example is illustrated in U.S. Pat. No. 7,221,330 ("Finke-Anlauff"), which shows a "user terminal" that is similarly configured. Other devices, such as e-book readers, also make use of multiple displays or of a single display that can be folded or bent.

Applications for these dual-screened devices typically make use of only one of the screens (the "primary screen"). To the extent that a single application uses both of the screens, it is often either to display auxiliary information such as status messages or alerts, to present complementary information such as an alternative perspective on what is displayed in the primary screen, or to treat them as a single larger screen.

SUMMARY OF CERTAIN INVENTIVE ASPECTS

Various embodiments of inventions generally relating to the use of multiple screens in computing systems are disclosed. In one example, a portable video interaction system, comprising a first screen displaying a first image and a second screen displaying a second image are positioned so that a composite image is formed on the first screen from the first image and the reflection of the second image. Some of the disclosed embodiments allow a user to interact with the composite image in much the same way that user might interact with a native image displayed directly on the first screen. Some of the disclosed embodiments feature a display piece positioned between the two screens such that the display piece modifies the composite image or is itself affected by the images on the two screens. Some of the disclosed embodiments feature mechanisms for aligning the screens so that an appropriate composite image appears, and some of the disclosed embodiments feature mechanisms for maintaining a particular alignment of the screens.

BRIEF DESCRIPTION OF THE DRAWINGS

FIG. 1 is a set of drawings which shows a composite image formed from a primary image and the reflection of a secondary image.

DETAILED DESCRIPTION OF CERTAIN INVENTIVE EMBODIMENTS

Figure 1A:
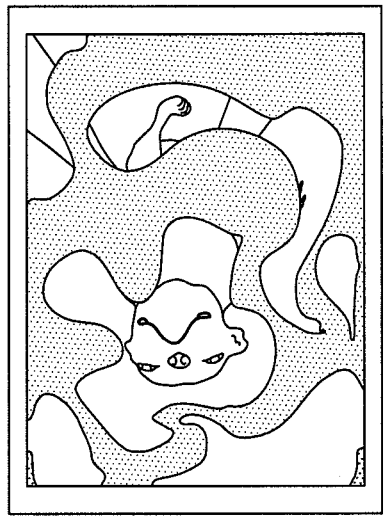
FIG. 1A shows a primary image and a secondary image.

Various aspects and features of the invention will become more fully apparent from the following description and appended claims taken in conjunction with the foregoing drawings. In the drawings, like reference numerals indicate identical or functionally similar elements. In the follow description, specific details are given to provide a thorough understanding of the disclosed methods and apparatus. However, it will be understood by one of ordinary skill in the technology that the disclosed systems and methods may be practiced without these specific details.

It is also noted that certain aspects may be described as a process and depicted as a flowchart, a flow diagram, a structure diagram, or a block diagram. Although a flowchart may describe the operations as a sequential process, many of the operations may be performed in parallel or concurrently, and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Various embodiments rely on the reflection one image onto another so as to generate a composite image. The general topic of composite image formation is addressed by reference to in FIGS. 1A and 1B and FIGS. 2A and 2B. Later figures refer to applications of composite imaging.

Certain embodiments apply composite images in the context portable computing devices, such as portable gaming devices. For example, some embodiments use composite images to reveal secret codes or passes that allow users to access hidden features of a game or obtain some other benefit. Providing this type of functionality through the use of a second screen can, in some circumstances, avoid the need for separately distributed physical components and make implementing such access codes an integrated part of the user experience. Some embodiments use composite images to present temporary hints or suggestions to a user in a way that leverages the presence of a second screen.

Certain users of games and other interactive software enjoy being able to play modified versions of their games. Developers also often make their products amenable to modification by others, modify the developments of others, or reuse their own earlier developments in a different context or with a different end-user experience. Some embodiments provide support for this type of "modding" or "skinning" through the use of composite images.

FIG. 1

FIG. 1A illustrates a primary image 102 and a secondary image 101. Neither image is complete in the sense that portions of the image seem to be omitted. For these particular images, a user can make an educated guess as to what each of the images depicts, but this need not be the case generally. For example, an original image could be divided into a primary image 102 and a secondary image 101 such that neither of the images 102,101 suggested the original image or, in some instances, suggested any sensible meaning at all.

Figure 1A:
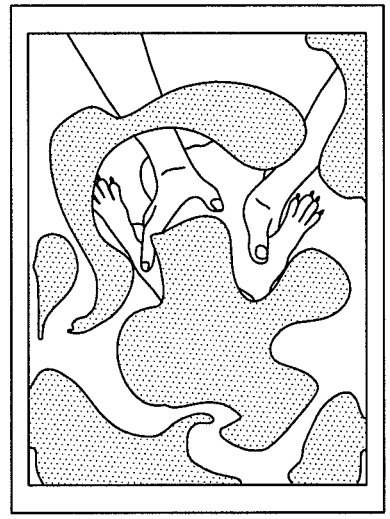
Figure 1B:
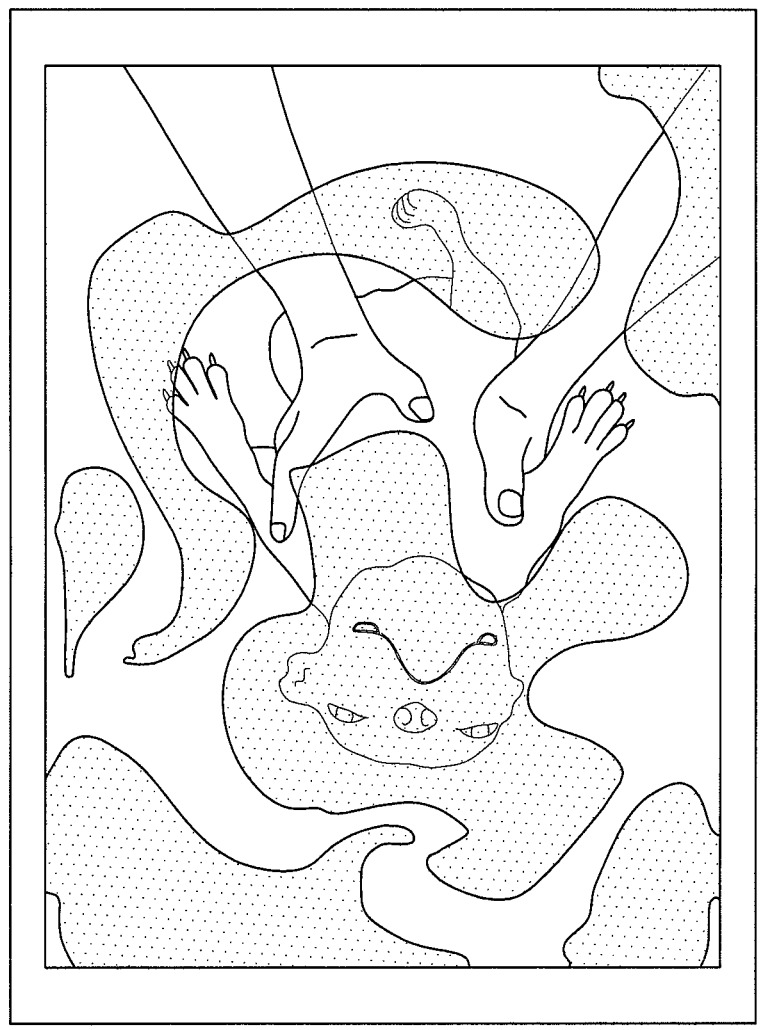
FIG. 1B shows the composite of the secondary image and the reflection of the primary image.

FIG. 1B illustrates the formation of a composite image 103 from primary image 102 and secondary image 101. Primary image 102 and secondary image 101 are created from an original image by dividing the image in two portions and then mirroring one of images 102 or 101. Composite image 103 is formed from the combination of the primary image 102 with the reflection of secondary image 101 such that composite image 103 sufficiently resembles the original image such that it is straightforward for a viewer to see what the original image looked like.

Thus a primary image 102 and a secondary image 101, each with no independent significance, can be combined into a composite image 103 that communicates meaningful information.

It will be appreciated that the composite image 103 can be formed by exploiting different ways of combining images 102,101. For example, the images 102,101 could be complementary such that the images 102,101 (or one of the images 102,101 and the mirror of the other) each contains distinct portions of the original image, as illustrated in FIG. 1. A composite image 103 formed from such images 102,101 is the simple combination of the two images 102,101.

In some embodiments, one or both of the images 102,101 contains additional content such that combining the images 102,101 yields a combination in which the additional content combines with a portion of the original image or with other additional content. Such embodiments are particularly effective for forming composite images 103 with a meaning that is different from images 102,101, one or both of which has its own independent meaning. For example, an original image of prisoners behind bars might be divided into an image showing the prisoners and an image showing the bars. One or both of those images 102,101 might then be modified by adding content, so that, for example, the image with the bars depicts animals in a zoo and the image of the image with the prisoners now shows them sitting around a fire, presumably plotting their escapades. If these modifications are made according to the techniques described herein, then the composite image 103 formed from reflecting one of these images 102,101 onto the other will depict a representation of the original image formed not merely by combining the partial depictions in the two images 102,101 but also by hiding the additional content.

FIG. 2

Figure 2A:
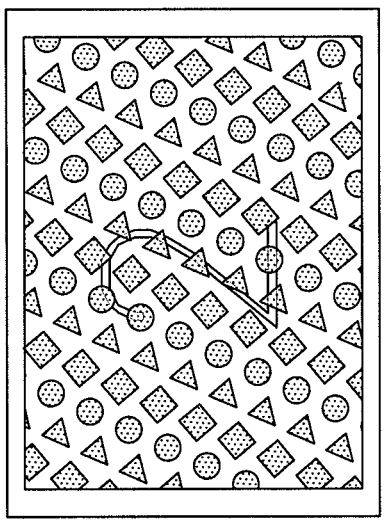
FIG. 2 is a drawing which shows an image with a masked hidden message and a decoding image (both showing in FIG. 2A) combined to create the composite image shown in FIG. 2B, which reveals the message.
Figure 2A:
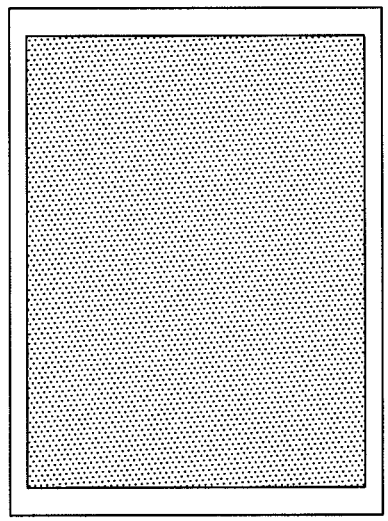

FIG. 2 illustrates another way in which a primary image 202 and a secondary image 201 can be combined to form a composite image 203. As seen in FIG. 2A, the primary image 202 may, by way of example, be a single color. The secondary image 201 consists of an underlying meaningful component, in this example a large number "2", which is masked or camouflaged by a pattern or image in the same color as the primary image 202.

Figure 2B:
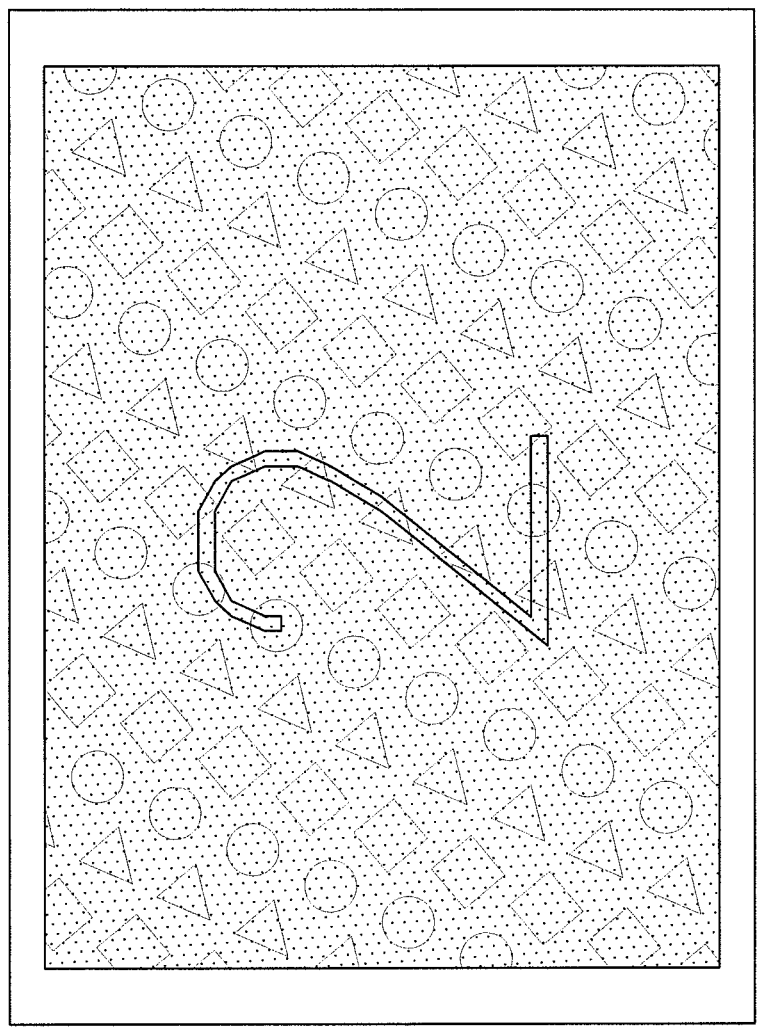

As illustrated in FIG. 2B, when the images are combined into a composite image 203 using color arithmetic, as opposed to simply overwriting one image with the other, the obfuscating mask of the secondary image 201 merges into the background provided by the primary image 202. This makes the meaningful content of secondary image 201 more apparent to a person viewing the composite image 203. Because of the additive color properties, it does not matter for the purposes of forming composite image 203 whether primary image 202 is put "on top" of secondary image 201 or vice versa. Top or bottom does not matter in this context. Also, because this method of forming a composite image uses the additive properties of color, more complicated schemes are possible. For example, suppose one of the images 202,201 contains a hidden message in blue and a mask in both red and green. If the other image is generally yellow with a complementary mask in green and red, the composite image 203 will show the complete blue message against a yellow background. This is because the masks of the first image will add to their complements, become yellow, and merge into the background.

Although the illustrated embodiment makes use of the additive properties of colors, the method of forming a composite image illustrated in this figure can be combined with other methods, including those described above. For example, by varying the brightness and coloring of the two constituent or source images, some portions of the composite image may result from additive color properties, some may result from overlaying and blocking, and some may consist of portions of one of the constituent images that have no counterpart in the other constituent image. Thus, a user viewing a composite image may recognize some elements as having originated in the source images, but might not recognize other elements as elements of either source image. This is because the unrecognized elements result from additive color properties.

FIG. 3

Figure 3:
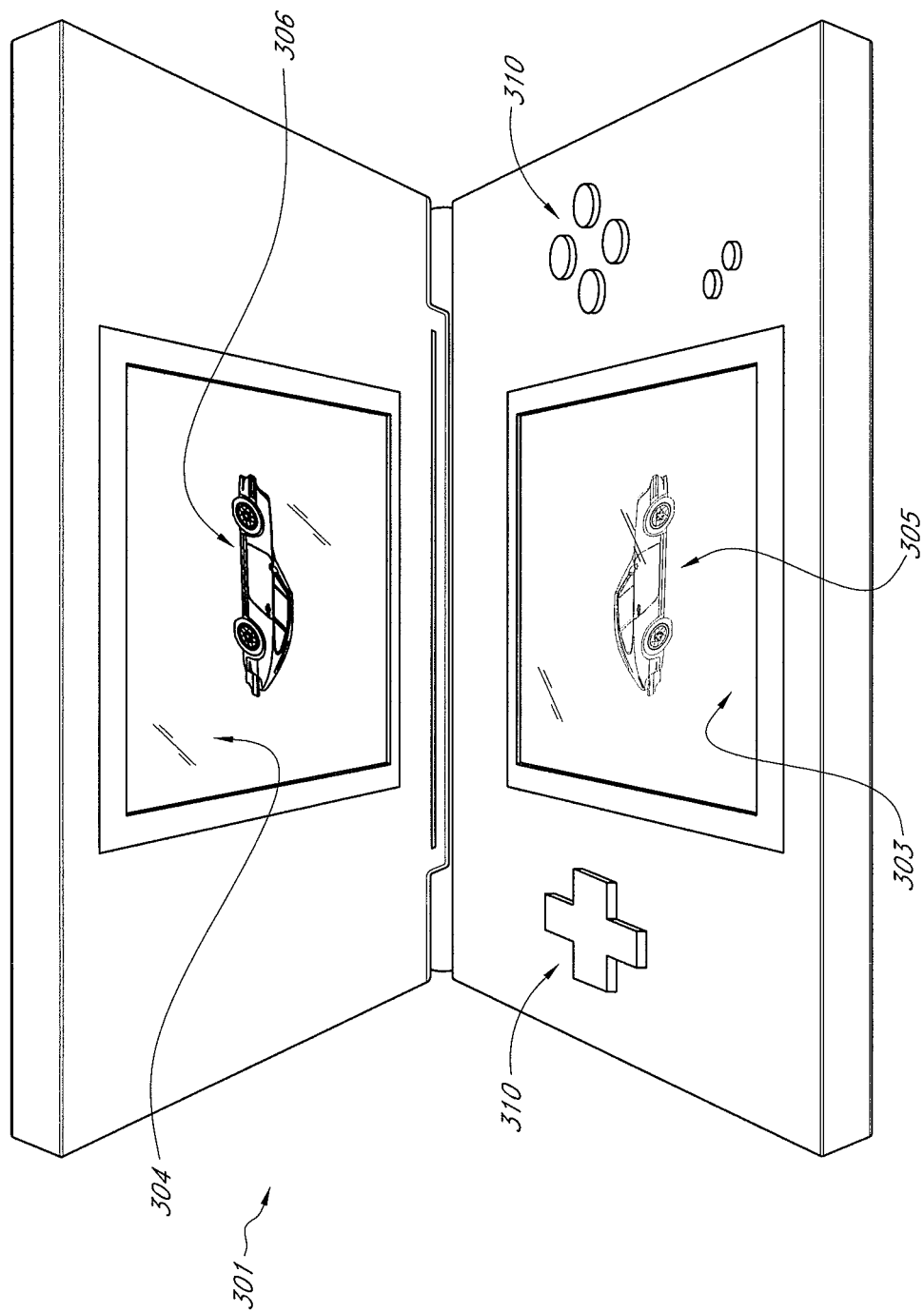
FIG. 3 is a drawing which shows more generally how the reflection of what is displayed on the secondary screen appears on the primary screen. It shows the screens arranged to be on planes that intersect on a horizontal axis.

FIG. 3 illustrates an example portable computing system 301. In system 301, primary screen 303 is below secondary screen 304. In this context, what is meant by primary screen is the screen which is the focus of a user's attention at a point in time. Thus, in this figure, screens 303 and 304 are positioned relative to each other and the user such that the user looks at primary screen 303 and sees on it the reflected image 305 of the image 306 displayed on the secondary screen 304. As discussed above, the composite image on primary screen 303 also depends on whatever image is directly displayed on primary screen 303. The colors, brightness, and shape of the image directly displayed on the primary screen 303 will influence how that image combines with the reflected image 305 to form a composite image. Fore example, a portion (or all) of the reflected image 305 may mask or hide whatever content is directly displayed on the area of primary screen 303 containing that portion of reflected image 305. Or, by varying the brightness and colors, the reflected image 305 may appear as a translucent image on the primary screen 303, allowing the content already on the primary screen 303 to still be seen. Another result is that the reflected image 305 combines with the image directly displayed on the primary screen 303 using additive color properties, as described above.

With no loss in generality, the top screen 304 could be characterized as the primary screen and the bottom screen 303 could be characterized as the secondary screen, as in some embodiments a user will focus on one of the screens 303,304 and in some embodiments a user will focus on the other.

Not shown is an example of a portable computing system in which two screens might be to the left and right of each other, like the pages of a standard book. In some such embodiments, a user's focus might shift between the left and right screens, as it typically does when reading a book. In some embodiments, either the left or right screen is the primary screen on which any composite images are shown, just as in some embodiments either the top screen or the bottom screen may be primary. Also, in some embodiments, each screen is both a primary and a secondary screen, with a user seeing a composite image on whichever of the screens she focuses on. The composite image seen may depend on which screen has the user's focus, even though the images on the right and left screens have not changed.

The controls 310 are only for illustration as embodiments may have the controls in arbitrary positions relative to the screens or the controls may even be separate from the screens, such as on a remote control, or absent. This would occur, for example, in the case of embodiments that do not support this type of user interactivity or that support tactile, haptic, or motion based interaction.

The illustrated embodiments have their screens attached at a hinge such that the device is a traditional clamshell. In different embodiments, the angle between the two screens may vary from 0 (shut, with no screens visible) to 360 (shut, with both screens visible). Naturally, angles of between 30 and 90 degrees are more useful for forming a composite image. Some embodiments have different mechanisms for maintaining the desired angle. For example, some may be fixed at a particular angle while others may be adjustable such as by a hinge or other flexible mechanism. Still others may be formed from a single flexible screen bent so as to have a primary portion and a secondary portion so as to be used in this application.

It is also possible that a single embodiment may be usable when oriented with the two screens intersecting on a horizontal plane, as with system 301, and with the two screens intersecting on a vertical plan, as with the example system discussed but not illustrated. For example, a gyroscope or other sensor detects that the device has been rotated from one position to another and causes the displays on the screens to be adjusted accordingly.

FIG. 4

Figure 4:
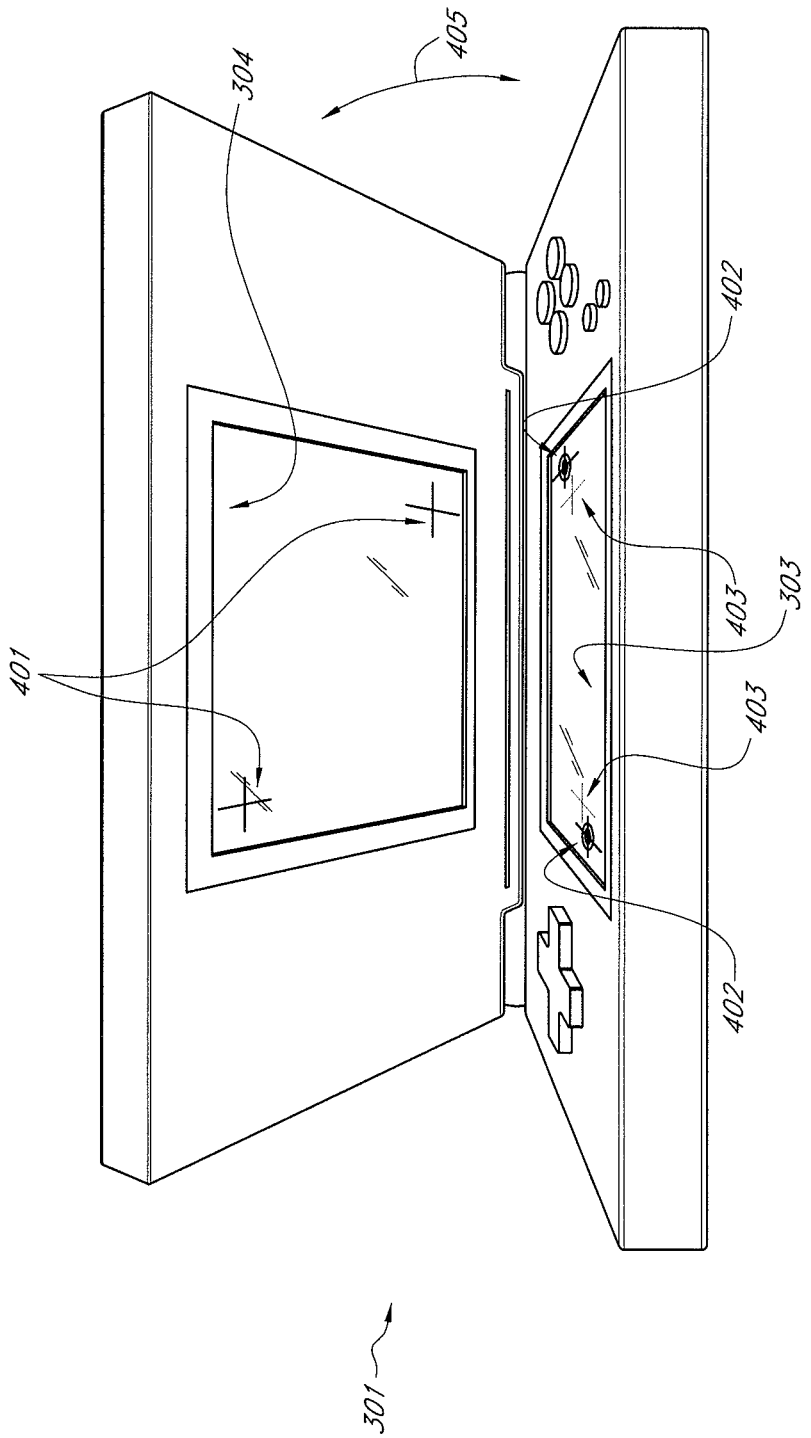
FIG. 4 is a drawing which shows the use of an alignment mechanism.

FIG. 4 illustrates one way in which an embodiment can be configured so that a user can see composite images or so that the embodiment can account for the relative positions of the screens and the user to properly generate composite images. As illustrated, one or more crosshairs or other targeting indicia 401 are displayed on the secondary screen 304. One or more target indicia 402 are displayed on the primary screen 303. The user may then adjust her position vis-à-vis the device 301. If the screens are adjustable, as, for example, hinged screens are, then the user may also adjust the relative angle 405 of the screens. When the user is satisfied that the reflections 403 of the targeting indicia 401 on the secondary screen 304 are positioned over the target indicia 402 on the primary screen 303, the user stops the adjustment and signals completion. This signaling may be done in any way supported by the system including, for example, through depressing a button on the controls 310 (FIG. 3), via touch of a touch screen or other haptic technology, or via voice interaction.

In some embodiments, the alignment may be sensed automatically if the primary screen 303 is photosensitive or can otherwise directly sense the image reflected from secondary screen 304. In some of these embodiments, alignment might be automatic or semiautomatic and adjust the relative positions of the screens without user interaction.

FIG. 5

Figure 5:
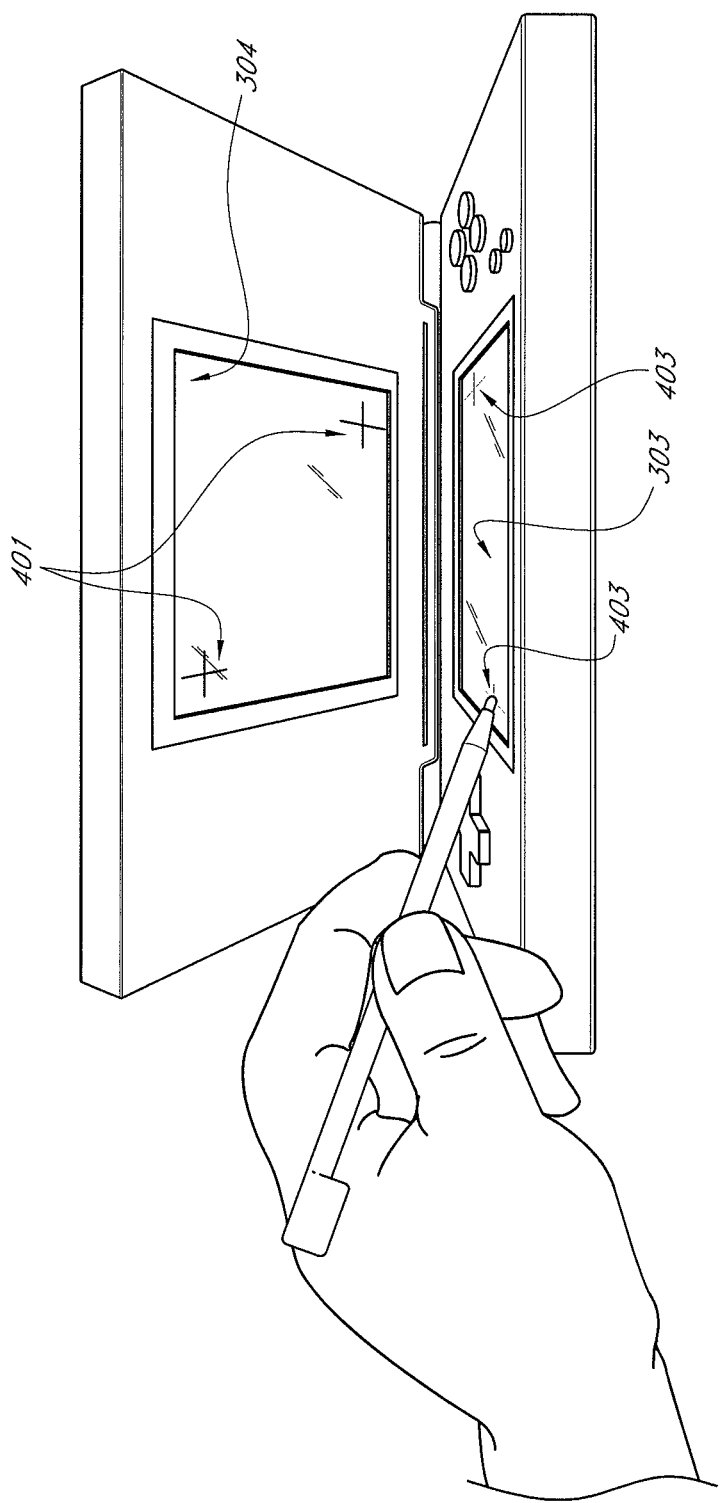
FIG. 5 is a drawing which shows the use of an alternative alignment mechanism that takes advantage of additional functionality of one of the screens.

FIG. 5 illustrates an embodiment supporting another method of alignment. Targeting indicia 401 are again displayed on the secondary screen 304. When a user is satisfied that the reflection 403 of the targeting indicia 401 on the primary screen 303 is adequate, the user signals this by tapping the primary screen 303 where a particular part of the reflection 403 of the targeting indicia 401 appears. Based on the location on secondary screen 304 where the targeting indicia 401 were displayed and where the user indicated the reflection 403 was seen, the system can determine how to display images on the screens in the future so that the user perceives the appropriate composite image when viewing the primary screen 303.

Other methods of indicating the location of the reflection 403 of the targeting image 401 are possible, including voice input, and photosensitive self-detection. In some embodiments, the primary screen 303 may be divided into locations according to a coordinate system, and the user can indicate the location of the reflection 403 by providing the system with the coordinates of that location.

Figure 13A:
FIG. 13 is a drawing which shows an example of how the angle between two screens can be maintained, with FIG. 13A showing an angle maintenance mechanism in the context of a dual-screen device and FIG. 13B showing more detail of an example angle maintenance mechanism.
Figure 13B:
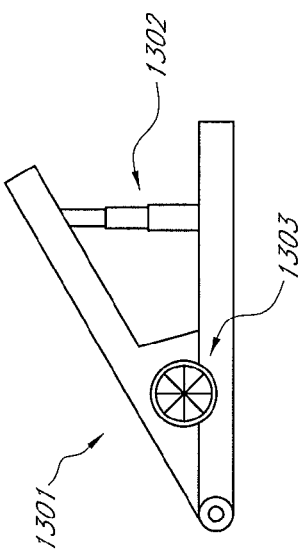
Figure 14:
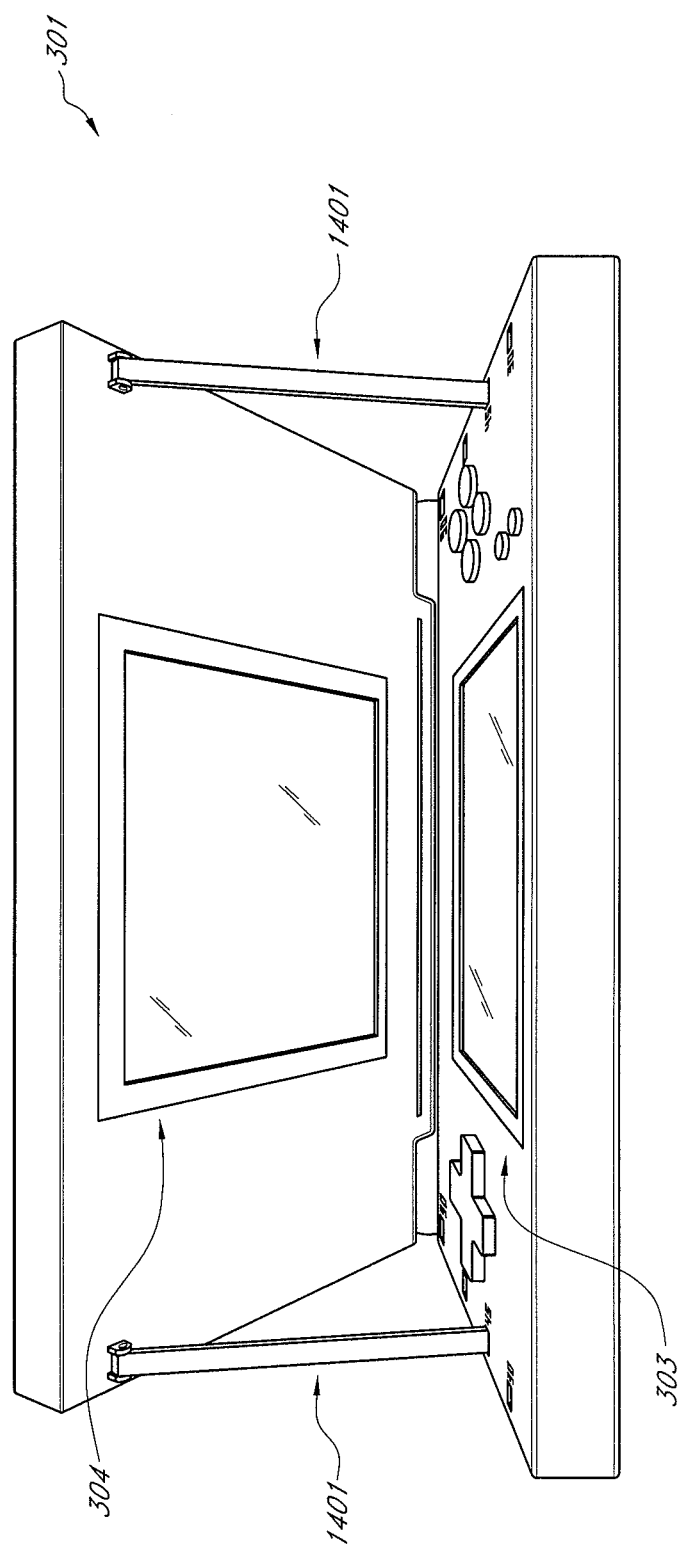
FIG. 14 is a drawing which shows another example of a mechanism for maintaining the angle between two screens.

FIGS. 13 and 14

FIGS. 13 and 14 show two examples of embodiments with angle maintenance mechanisms for maintaining or establishing an alignment between the screens 303 and 304. Not shown is another embodiment, in which the friction or resistance of the hinges between the screens 303 and 304 maintains the screens in a given position once they are put in that position, as with current versions of the Nintendo DS. Such an embodiment might support maintaining an angle by, for example, tightening a hinging mechanism by expanding one of the components so as to impede the motion of the hinge.

In FIG. 13, an example angle maintenance mechanism wedge 1301 is shown. Some embodiments may include basic wedges 1301 with fixed angles between the upper and lower surfaces. They may be used to maintain that angle between the screens 303 and 304. Other embodiments include adjustable angle maintenance mechanisms, such as a more sophisticated wedge, as illustrated in FIG. 13B. There the wedge has an internal telescoping pole 1302 which is controlled by a user accessible control 1303. The pole is just one example of an internal angle control structure. Other types of internal angle control structures and other types of user accessible controls 1303 may be used to achieve the same result, which is a wedge 1301 which can be adjusted so that it maintains the screens 303 and 304 at a particular angle.

A wedge, like other angle maintenance mechanisms, may be integrated into the device. For example, a wedge 1301 may be recessed into the device so that when the wedge is flat, the device can shut completely. Also, although FIG. 13 shows only one wedge, embodiments may use multiple wedges.

FIG. 14 shows another embodiment of an angle maintenance mechanism consisting of one or more struts 1401. As with the wedges 1301, struts 1401 may be integrated with the device or may be available separately. Although other configurations are possible, FIG. 14 shows the struts 1401 attached to the device near the secondary screen 304. When not in use, the struts 1401 may be detached or, for example, telescoped into a recessed hole in the device or snapped into place into a recessed groove on the device. When in use, in one embodiment the end of the strut 1401 not attached to the device near the secondary screen 304 is attached to the device near the primary screen 303. In a telescoping embodiment, the strut 1401 may be extended or shortened to maintain the screens 303 and 304 at a particular angle. In some embodiments, a fixed length strut 1401 is attached to the upper surface via a hinge or joint, and a particular angle is maintained by attaching the strut 1401 to the bottom surface at a particular location. In some such embodiments, such as that illustrated in FIG. 14, locations may be labeled so that the user can quickly set the screens 303, 304 in the relative position suggested by the system. The latching mechanism in some embodiments is such that the screen 303 and 304 are not just impeded from getting closer to each other (a smaller relative angle), but are also resistant to being placed further apart (at a larger angle).

Wedges 1301 and struts 1401, each capable of multiple implementations, are but examples of different ways in which a given angle between screens 303 and 304 can be maintained.

In some embodiments, for a given image on primary screen 303 and a given image on secondary screen 304, different composite images may be formed depending on the angle between the screens 303 and 304. Embodiments may leverage this by, for example, instructing the user, independent of any alignment process, to maintain the screens 303 and 304 at a particular angle. Adjustable angle maintenance mechanisms, including those shown in FIGS. 13 and 14, are an example of how some implementations support this functionality by allowing users to set the screens 303 and 304 at the angle indicated by the device.

In some embodiments, the adjustable angle maintenance mechanism may be controlled by the device itself, via software or hardware. For example, the angle could be maintained at the angle determined using an automatic alignment process as described above or by setting the screens at an angle chosen to display an appropriate composite image. In some of these embodiments, a user accessible control is not available because the adjustments are implemented by the system. Some embodiments may even reestablish a setting dynamically during the course of a game or video, for example, when it is appropriate to display one of the several composite images that are made viewable at different angles.

FIG. 6

Figure 6A:
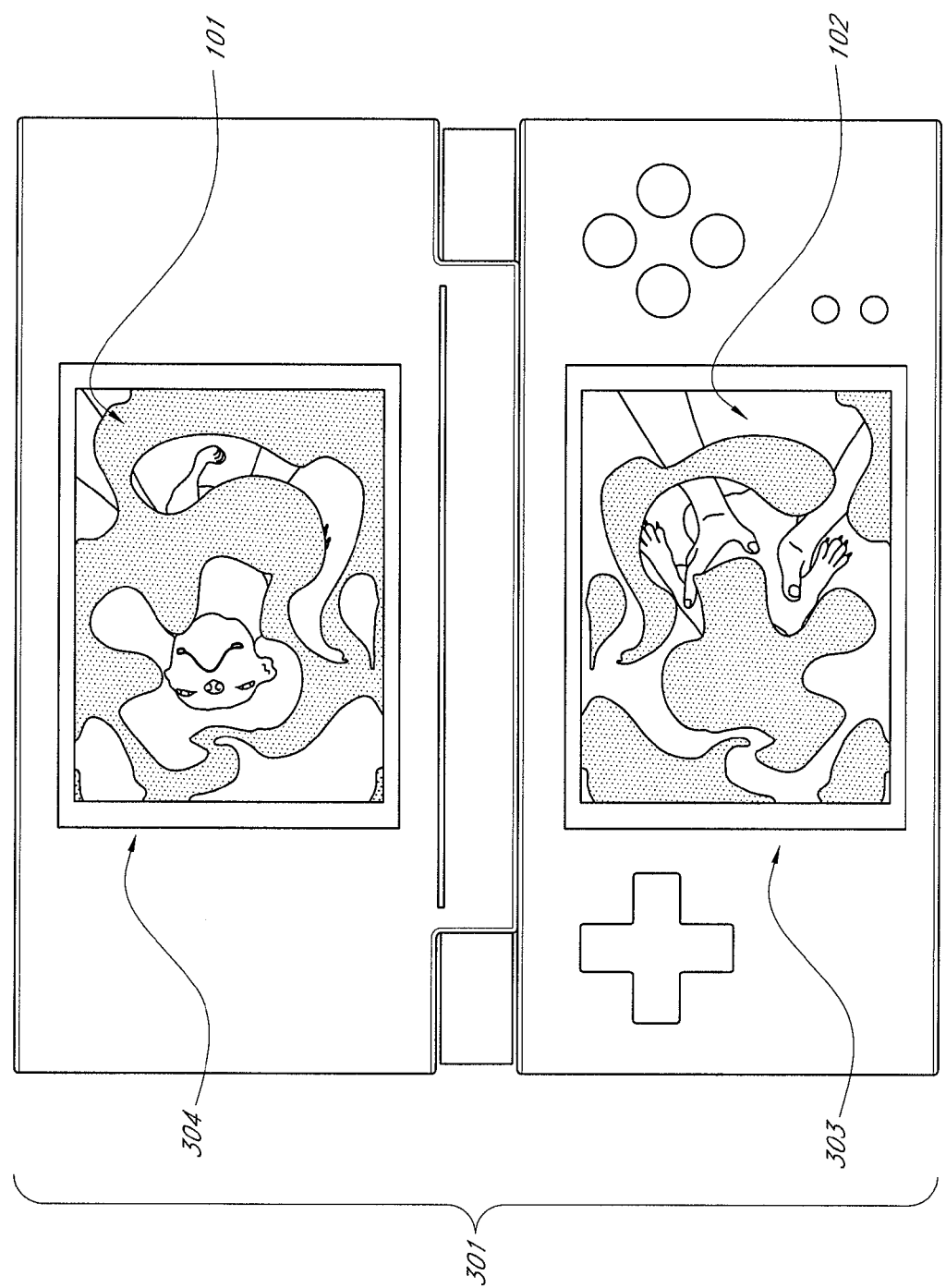
FIG. 6 is a set of drawings which shows how the composite image of FIG. 1B can be created in a dual-screen device if the primary screen displays the primary image and the secondary screen displays the secondary image, as shown in FIG. 6A, and the device is configured as exemplified in FIG. 6B.
Figure 6B:
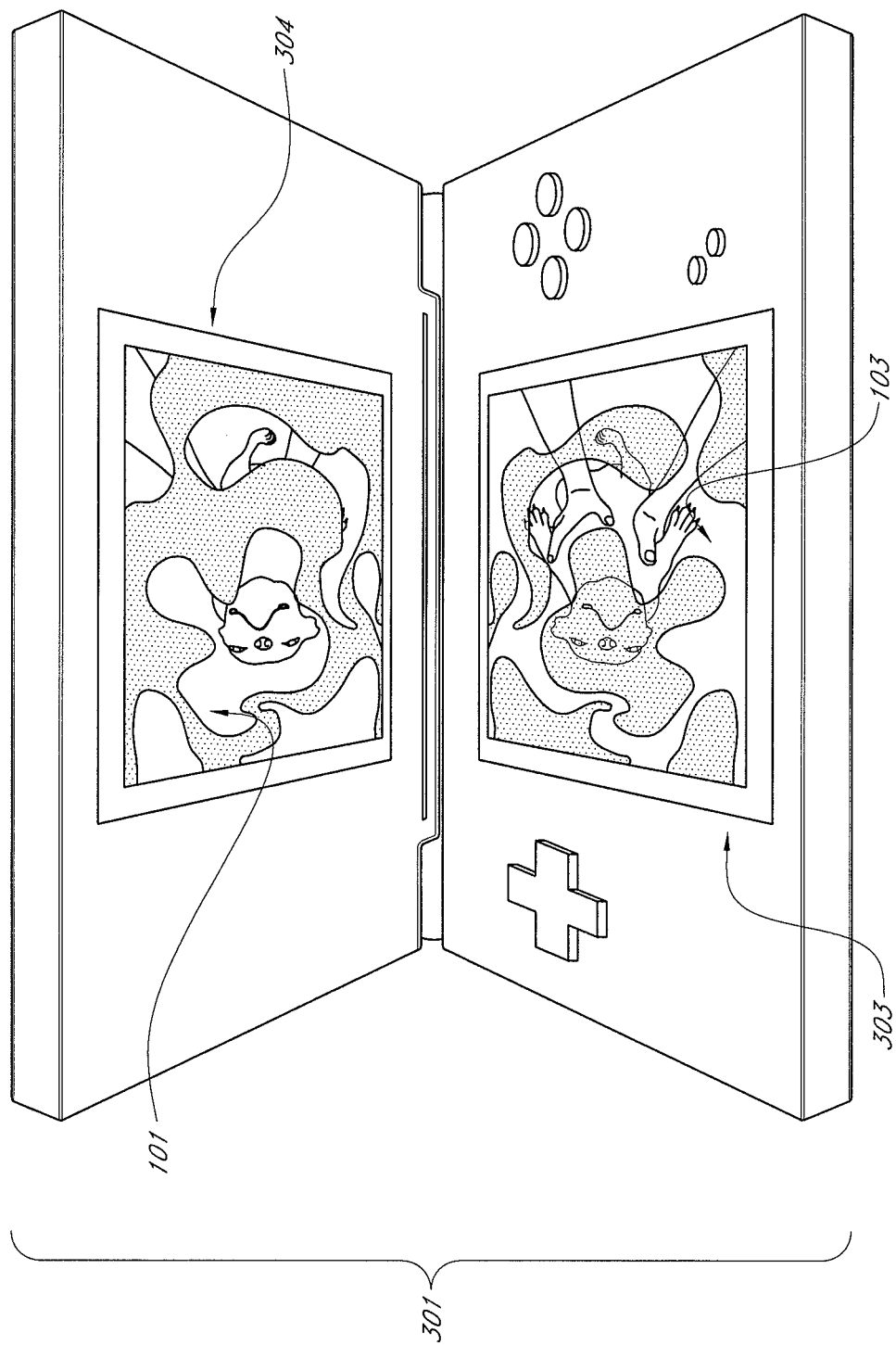

FIG. 6 shows how the creation of the composite image 103 from the images 102,101, as shown in FIG. 1, can be implemented by the embodiment 301 of FIG. 3A. In FIG. 6A, the primary image 102 is displayed on the primary screen 303 and the secondary image 101 is displayed on the secondary screen 304. Assuming that the relative positions of a user, the primary screen 303, and the secondary screen 304 have been established appropriately, as discussed above, FIG. 6B illustrates how this embodiment presents a user whose attention is focused on the primary screen 303 with the composite image 103.

FIG. 7

Figure 7B:
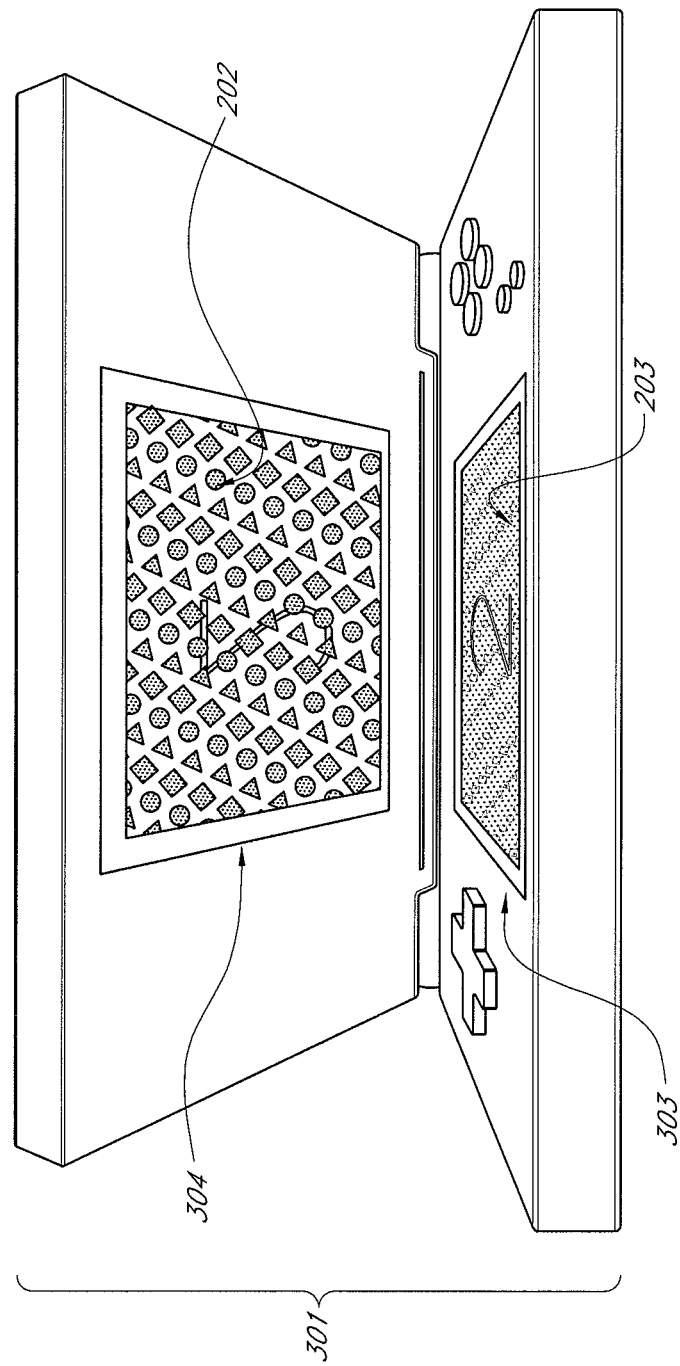
FIG. 7 is a set of drawings which shows a hidden message in the primary screen (FIG. 7A) exposed in a configuration creating a viewable composite image (FIG. 7B).

FIG. 7 shows how the creation of the composite image 203 from the images 202,201, as shown in FIG. 2, can be implemented by the embodiment 301 of FIG. 3A. As shown in FIG. 7A, the primary image 202 is displayed on the primary screen 303 and the secondary image 201 is displayed on the secondary screen 304. Again, assuming that the relative positions of a user, the primary screen 303, and the secondary screen 304 are appropriate, then when the user directs her attention to the primary screen 303, she sees the composite image 203, as depicted in FIG. 7B.

One of the ways in which the embodiments illustrated in FIG. 6 and FIG. 7 can be used is to enable secret clues, passwords, or similar access codes. These might provide the user of a game with information or directions necessary to complete a problem or access a hidden level, for example. The composite image creation allows a game developer to integrate the provision of these features into the in-game experience by, for example, implementing an embodiment where a hidden message appears on a mirror, painting, or other appropriate element of the game.

This functionality may also be dynamic. For example, an embodiment can modify the displays on the primary and secondary screens so that the user experience is generally consistent for all users. However, some embodiments take into account information about the user such as profile data, demographic data, or data about their experience with the game or application in question. At various points during the experience, such an embodiment will modify the displays of the primary or secondary screens to that the user sees a composite image particular to that user, with content determined, at least in part, by the user information. To illustrate with a specific example, information about a user's greatest fear may be known and accessed. For a user whose fear is rats, a game sequence may involve a chamber filled with rats. For a user whose fear is snakes, the same sequence may involve the same chamber, only filled with snakes. This may be achieved by modifying the image on the secondary screen to include rats or snakes based on the preference. Other embodiments may include both rats and snakes, but modify other properties of the primary and secondary images to dynamically cause one or the other to appear in the composite image.

FIG. 8

Figure 8:
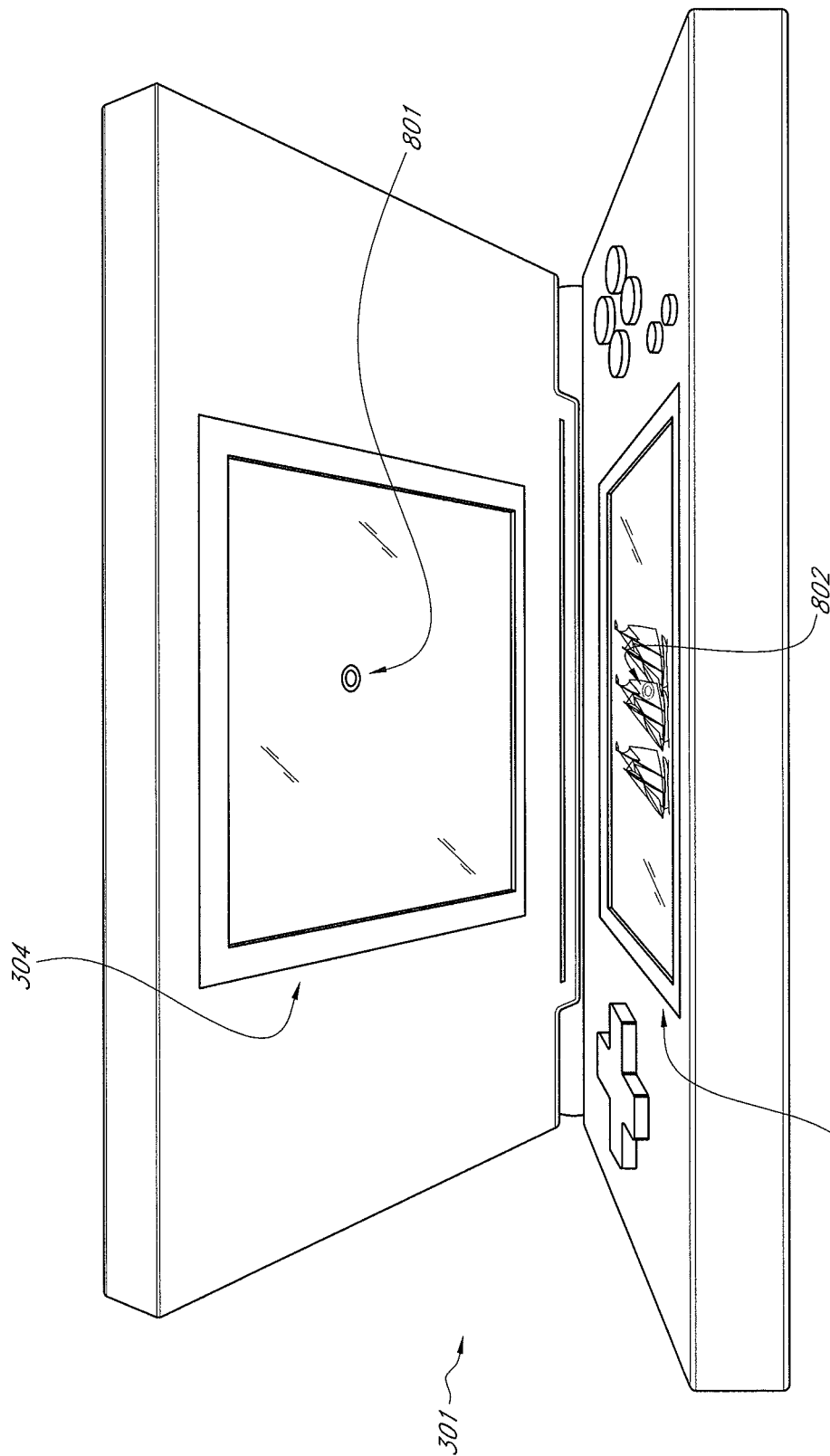
FIG. 8 is a drawing which shows the reflection of a value-adding image appearing on the display of the primary screen.

FIG. 8 illustrates another application of composite imaging with primary and secondary image displays. Primary screen 303 contains an image of sailing ships. Secondary screen 304 contains a targeting image 801. In the composite image viewable on primary screen 303, the reflection 802 of the targeting image 801 appears superimposed on the sail of the ship that the user is meant to attack.

Software developers may be given flexibility as to how and when to use these features. For example, even when an embodiment is properly configured for the viewing of composite images, a developer may choose to only provide targeting assistance in certain contexts or to certain users. Some implementations allow users to disable the display of some or all of the composite images. Numerous other ways to provide options exist: the size or intensity of the target may vary based on different parameters so that sometimes the composite image features a small, faint, target while other times it is more obvious. As discussed above, some implementations may embed the hint image as part of the image displayed on the secondary screen 304 and use the techniques discussed above to make it visible in the composite image. On the other hand, some implementations may embed the hint image as part of the image displayed on the primary screen 303. In such an embodiment, the image on the secondary screen 304 might be adjusted to use the color and light properties discussed above such that the composite image reveals the hint image.

FIG. 9

Figure 9:
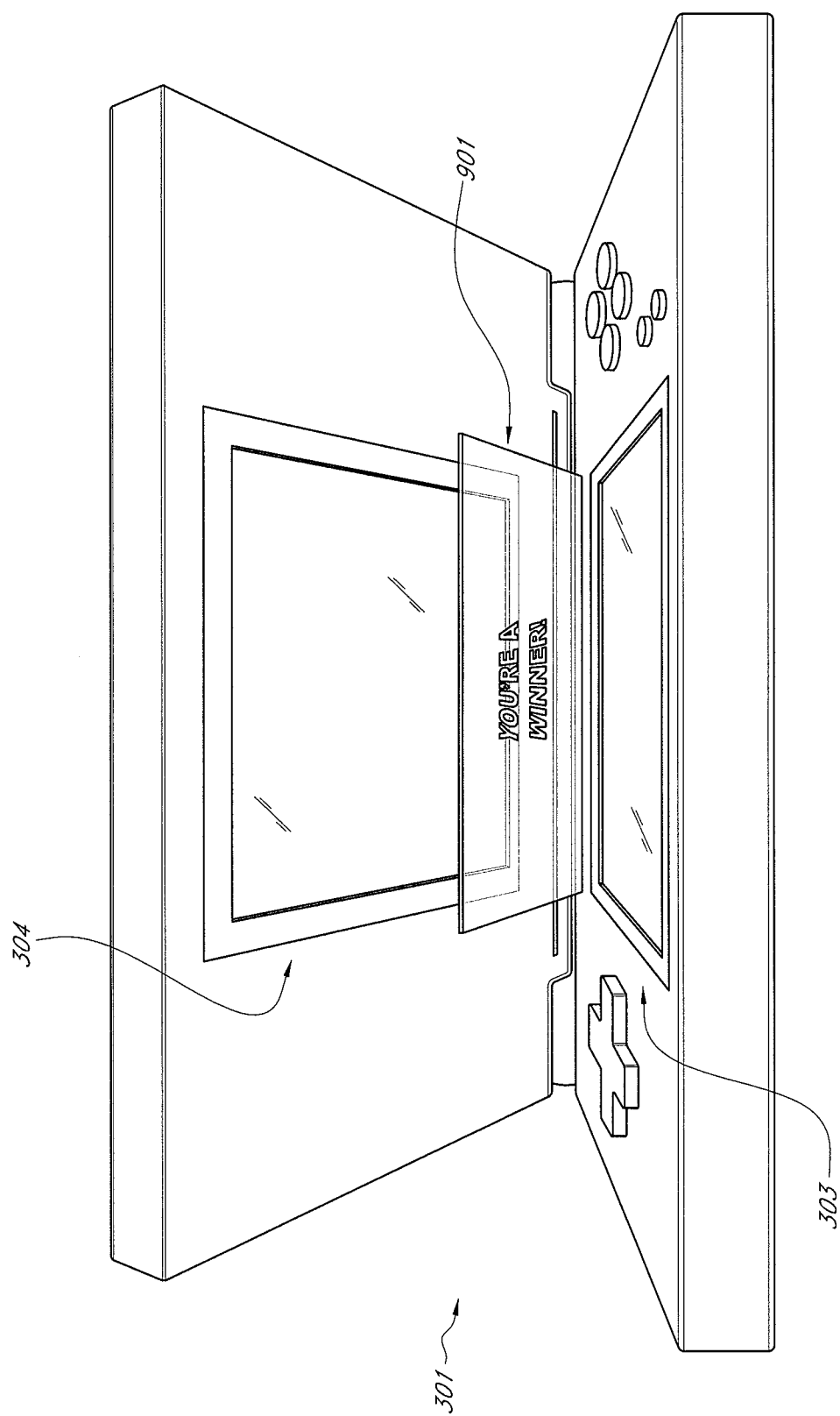
FIG. 9 is a drawing which shows a hidden message on a third screen between the primary and secondary screen becoming visible because of the images on the primary and secondary screens.

Some embodiments of the system feature a third component placed between the primary screen 303 and the secondary screen 304. For instance, a third screen 901 is shown in FIG. 9. How the third screen 901 is incorporated depends on the design. For example, the third screen 901 may be attached via a hinging mechanism so that it can be flush with one or both of the other screens or remain in an intermediate position, as illustrated. In some embodiments the third screen 901 may be removable or optional, such that a user can attach or remove third screens 901 to the system 301. The third screen might not be permanently affixed to the system 301 and instead it might be held in place by the user.

In FIG. 9, the third screen 901 is displaying a message that the user has won a prize or sweepstakes. However, the message is only visible to the user because of the particular images on the primary screen 303 and the secondary screen 304. In the illustration, those images are simply monochromatic rectangles, but in other embodiments more complex images are used to bring out the image embedded in the third screen 901.

The illustrated third screen 901 is somewhat similar to games pieces which reveal their message when viewed through tinted lenses. While such game pieces can be viewed using some embodiments, pieces that require two different light sources can also be used, thereby taking advantage of the dual screen displays in system 301.

Some embodiments may only reveal the message on a third screen 901 when particular colors are displayed on the primary screen 303 and the secondary screen 304. Other third screens 901 may display different images, depending on the colors on the primary and secondary screens. In other embodiments, both the colors and patterns (including multiple colors) displayed on the primary screen 303 and secondary screen 304 will affect what, if any, image is visible on the third screen 901.

The third screen 901 can be flush with either screen or at any angle in between them. For some third screens 901, the effect of the displays from the primary and secondary screens 303,304 varies depending on the angle. For example, if the third screen 901 has a ridged surface or consists of multiple layers with different properties, then the third screen's interaction with the light emitted from the screens 303,304 may vary depending on the angle of incidence of that light.

A third screen 901 may function in other ways, and may, depending on the conditions, be able to function in more than one way. For example, a third screen 901 may act as a lens which magnifies, shrinks, flips, or otherwise modifies the image on the secondary screen 304 before it forms a composite image on the primary screen 303. A third screen 901, particularly one this is flush or nearly flush with the primary screen 303, may also magnify the image on the primary screen 303 so that it is easier to view. Also, in much the same way that the images displayed on the primary and secondary screens 303,304 combine to form a composite image, an image on the primary screen 303 (which may itself be a composite image) can combine with any image on the third screen 901 to form another, different, composite image. Arranging the relative positions of the users and the screens 303,304,901 to allow for such chaining of composite images is similar to the process for enabling and viewing a composite image on the primary screen 303, although it involves more potential adjustments. Embodiments using a third screen 901 in this fashion may have the third screen 901 configured so that it can be viewed directly by the user. For example, in some embodiments it attaches to the system 301 at the other end of the primary screen at location 902 or the other end of the secondary screen at location 903.

FIG. 10

Figure 10:
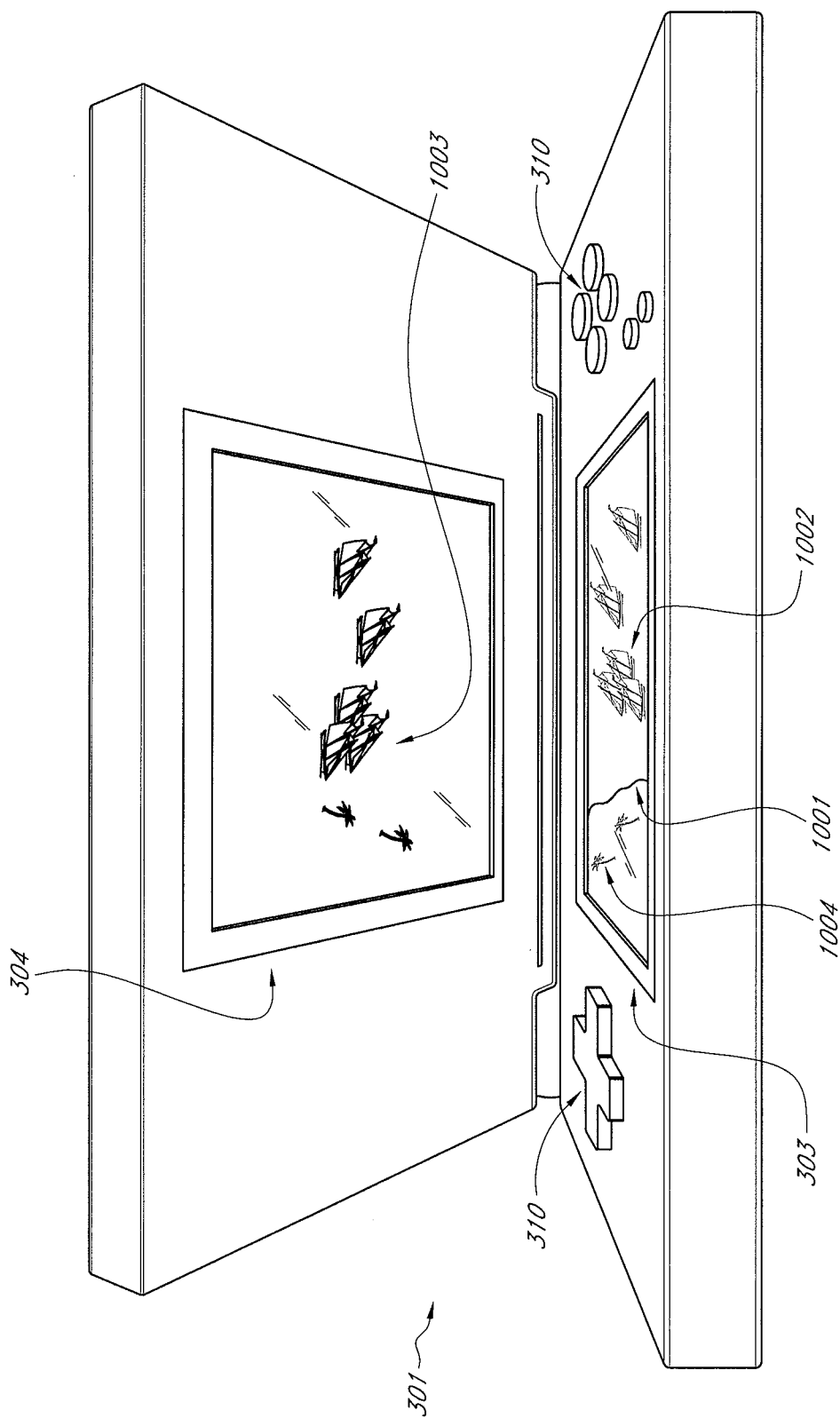
FIG. 10 is a drawing which shows that the reflections of images displayed on the secondary screen can be components of the interactive experience displayed on the primary screen.

In addition to providing assistance, enabling access codes, or using composite images to render alternative versions of scenes, some embodiments enable a more comprehensive skinning or modding of a game or application. Skinning and modding are terms for the practice of changing the appearance of characters and objects in a game, application, or video. For example, some Microsoft Windows™ applications can be skinned to have the appearance of Apple MacOS™ applications and some popular video games can be modded so that instead of fighting zombies the user is fighting clowns. FIG. 10 illustrates how an embodiment of the present invention can perform skinning or modding.

The scene displayed on the primary screen 303 involves, in this example, sailing ships navigating off of a tropical coast 1001. The sailing ship reflections 1002 and the palm tree reflections 1004 in the composite image on the primary screen 303 are the result of the reflection of the image 1003 on the secondary screen 304. The system causing the image to be displayed on the secondary screen 304 is updating the secondary screen 304 so that the sailing ship reflections 1002 and the palm tree reflections 1004 appear at particular places on the primary screen 303. Because the composite image features the reflected images at known locations, the systems controlling the display of images on the primary screen 303 and the secondary screen 304 and the system controlling the overall game or user experience can present the user with an end experience just like the one the user would experience if the elements of the composite image were directly displayed on primary screen 303. The user can experience interaction with the elements of the composite image using the controls 310 or other interaction mechanisms of the system 301 and the composite image will update accordingly. Thus, the user can steer the sailing ship reflections 1002 or shoot at them, and, despite their being reflections of images on secondary screen 304, they will respond as appropriate for the game.

Another example, not illustrated, of skinning or modding is manipulating the display on the secondary screen 304 so that the composite image formed on the primary screen 303 has modern battleships instead of sailing ships. The battleships are still fully integrated into the gameplay.

One way in which this can be implemented is to establish interactive locations or references on the primary screen 303. The system controlling the display on the primary screen 303 and the system controlling the overall game will move these references, record information about how the user is interacting with those references (e.g., if the user has tapped on a reference or moved a cursor to the reference), and cause other elements of the game and any images natively displayed on primary screen 303 to respond to changes in the state and location of the references. Other components of the game system, such as the system controlling the display on the secondary screen 304, access the information about references and, possibly, other information such as the state of the game or the profile of the user. Using that information, these components cause images to be displayed on the secondary screen 304 such that the resulting composite image on the primary screen 303 presents the desired images, which appropriately reflect the information, at the reference locations.

Using such an embodiment, the same game play engine that controls the game and generates the images native to the primary screen 303 can be modded or skinned by swapping out the images so that the user doesn't experience the tropical sailing scene depicted in FIG. 10, but instead, for example, sees a composite image of arctic landscape incorporating seal reflections instead of the sailing ship reflections 1002 and igloo reflections instead of the palm tree reflections 1004.

Some embodiments may use these techniques to modify content other than games. For example, the appearance of video being displayed on the primary screen 303 can be modified in this way, particularly if the embodiment has knowledge of behavior and location of the various characters and objects depicted in the video.

FIG. 11

Figure 11:
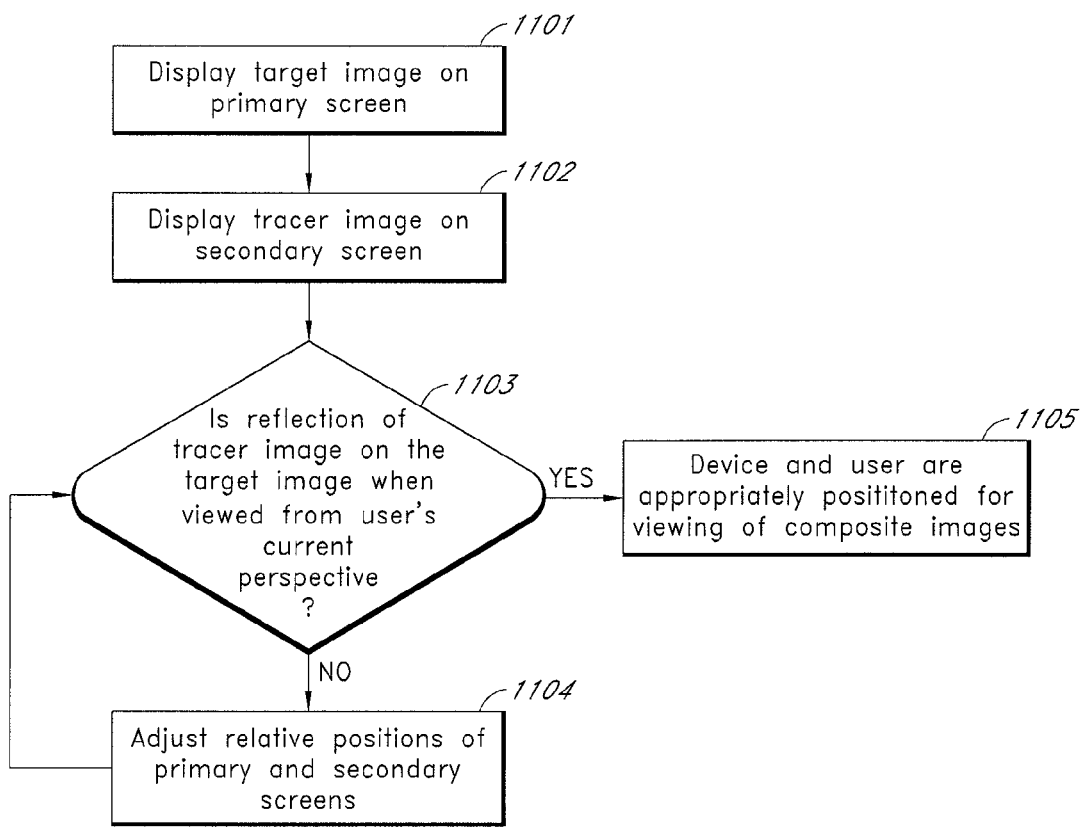
FIG. 11 is a flowchart which shows a process by which a user, a primary screen, and a secondary screen are aligned.

FIG. 11 illustrates a process by which a user, a primary screen, and a secondary screen are aligned. This figure may be better understood with reference to FIG. 4 and FIG. 5. The process begins at step 1101, when an image is displayed on a primary screen 303 of an embodiment. At step 1102 a tracer image is displayed on a secondary screen 304 of the embodiment. The order of the steps 1101,1102 could be different, the images could be displayed simultaneously, or one or both of the images could already be present on the screens or could be displayed as part of the alignment process.

In the process as illustrated, at step 1103 the user determines if the reflection of the targeting indicia appropriately overlaps the targeted indicia displayed on the primary screen. The user makes this determination from the vantage point she will typically have when using the system. Alternatively, the user could adopt a different perspective but compensate for the difference when making the determination as to whether the images are aligned. In another variation, multiple alternative alignments are possible, such as by aligning the reflection of the tracer with either a first target or a second target. The different alignments result in different composite images during subsequent use of the system, both composite images being meaningful in the context in which they are presented to the user.

If the user determines that the alignment is not proper, at step 1104 the user adjusts the relative positions of the primary screen 303 and the secondary screen 304. The user may also adjust her perspective or viewing vantage point. As discussed, different embodiments present a broad variety of adjustment means. Some embodiments may not present any means of adjusting the relative position of the screens, limiting the user to adjusting her perspective or taking advantage of other possibilities, such as the ability to control the alignment of the images displayed on one or both of the screens as with the horizontal hold or vertical hold controls for many televisions and monitors. If the process includes such an image alignment function then preferred embodiments will continue to display images on the screen in accord with the adjustments even after the conclusion of the alignment process.

After an adjustment is made, the process returns to step 1103. If the user determines the alignment is appropriate, at step 1105 the process concludes. In some embodiments, the process may conclude when the user explicitly indicates that the alignment is acceptable or unacceptable, which may be done using any interface supported by the embodiment, including voice, controls, touch, or haptic input. In some embodiments the user may simply exit the alignment process, not affirmatively indicating to the device whether alignment succeeded or not.

Other alignment methods are possible, including more automated methods wherein the device itself may adjust the relative positions of the screens or the alignment of the images displayed on the screens. In some embodiments the device may determine when the alignment is proper, for example by referencing information about the known or assumed position of the user and by referencing information about the physical alignment of the screens. In some embodiments the device may detect the location of the reflection through the use of photosensitive components. In general, available technology, or technology developed in the future, can be used in a number of different ways to implement or support an alignment process such that when the process is successfully completed the embodiment can make composite images viewable to a user.

FIG. 12

Figure 12:
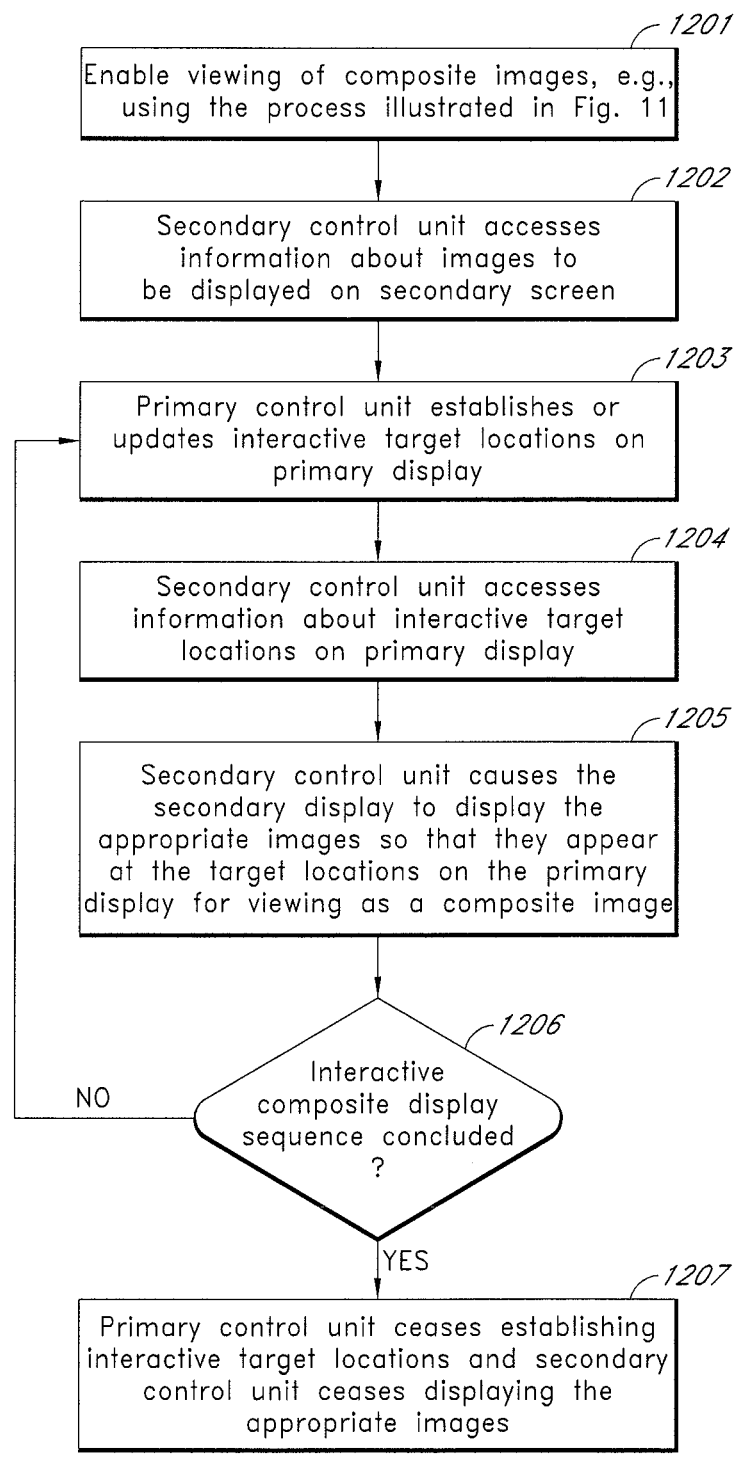
FIG. 12 is a flowchart which shows a method for creating scenes of composite images on a primary screen that include reflections of images on a secondary screen

FIG. 12 illustrates a process for generating on a primary screen a composite images that includes reflections of images displayed on a secondary screen FIG. 12 may be better understood with reference to FIG. 10 and the discussion of that figure.

The process begins at step 1201, with the system configured such that it can make composite images on the primary screen 303 viewable to a user. This state may be obtained as discussed above or via other means.

In step 1202, a secondary control component controlling the display on the secondary screen 304 accesses information about the images to be displayed on the secondary screen. The information may, for example, be based on a user preference or it may be established as part of a theme, modification, or skin that modifies an original application. Among its other benefits, the customization enabled by this step 1202 of the process allows a single game or game engine to support a variety of different scenarios or settings. For instance, depending on the images displayed, a user might experience hunting deer with a shotgun or chasing pirate ships with a navy cruiser.

At step 1203, a primary control component controlling the display on the primary screen 303 establishes references, described above, which may be associated with locations on the primary screen. If such references have already been established, step 1203 is also when the primary control component updates those references. In some implementations, references are processed by the game just like any other meaningful entity. For example, if the reference is a placeholder for a structure, then the game will ensure that characters react to interacting with the structure, such as by entering or leaving or by bouncing off of it. The game also updates a status or record associated with the reference to indicate any changes in the sate of the reference that are appropriate for the game, such as it being hit by ammunition. Similarly, if the reference marks a non-player character or a user-controlled character, then its properties will include not just a dynamic location, but also any game appropriate state like hit points or inventory. The game application and the primary control unit may not actually cause an image to be displayed on the primary screen to represent that reference. Also, some of the properties of a reference may themselves include references. For example, a reference to a character may have an inventory property, and in that character's inventory may be references representing food or clothing.

At step 1204, the secondary control unit accesses the information about the references, including their location and state. Then, at step 1205, perhaps after modifying the images from step 1202 in accordance with the information accessed, the secondary control unit causes images to be displayed on the secondary screen 304. Because the device is already aligned from step 1201, the secondary control unit causes the images to be displayed such that the resulting composite image viewable on primary screen 303 incorporates and integrates the dynamically loaded images into the game or user experience. The composite image may be formed by at least any of the mechanisms discussed elsewhere in this specification.

Step 1206 indicates that this process can be repeated: the game continues to update the information about the reference and the secondary control unit continues to adjust the display on the secondary screen 304 such that the composite image accounts for the updates. If the sequence is concluded or if the system becomes aware that an appropriate composite image is no longer viewable because, for example, the screens are no longer aligned, the process may terminate as in step 1207.

Other embodiments may feature variations of this process. In some, the game or primary control unit may indeed cause images to be displayed at the reference locations and update those images appropriately. In some such embodiments, the composite image viewable on the primary screen 303 is created using techniques discussed above that cause the image on the secondary screen to overwrite or modify the preexisting image at the reference.

Also, there are a wide variety of ways in which the information can be stored and accessed. The primary control unit, secondary control unit, and main game or application may be the same system or may be organized in other ways. The secondary control unit may become aware of the need to update the display on the secondary screen 304 as described, via message passing, or through a variety of other means of inter-process communication.

Conclusion

Although specific embodiments of a composite imaging system have been disclosed, other embodiments that are apparent to those of ordinary skill in the art, including embodiments which do not provide all of the benefits and features set forth herein, are also within the scope of this disclosure. The foregoing description of preferred implementations has been presented by way of example only, and should not be read in a limiting sense. Accordingly, the scope of protection is defined only by reference to the appended claims. For example, changes may be made in details of disclosed embodiments without exceeding the scope of the disclosure and the claims hereto attached. As used in these claims, "interactive experience" includes, but is not limited to, interactive video experiences, video games, movies, simulations, education applications, and training applications.

Figure 15:
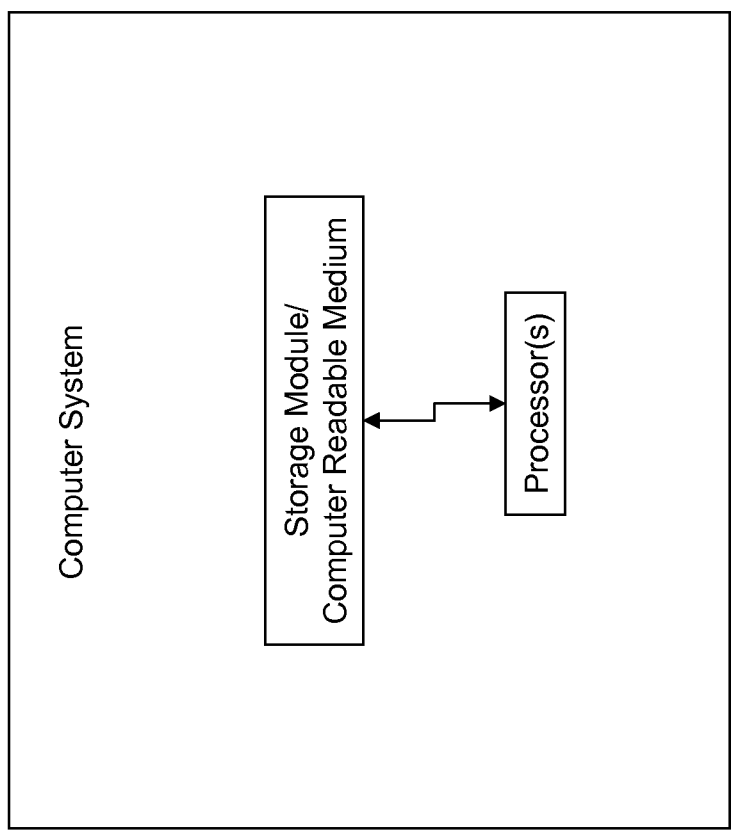
FIG. 15 illustrates an example computer system.

All of the systems described above may include one or more general purpose computers or processors and/or may include one or more special purpose computers or processors. All of the processes described above may be embodied in, and fully automated via, software code modules executed by one or more general purpose computers or processors, or alternatively, by specialized computer hardware, for example as illustrated in the example computer system of FIG. 15. The code modules may be stored in any suitable type of computer-readable medium or computer storage device. The various computer hardware resources (physical computers, processors, storage devices, etc.) used to run the disclosed software components, collectively form and operate as a computerized system. The various processing nodes of the computerized system may communicate over one or more computer networks, and may, but need not, be co-located.

What is claimed is:

1. A portable video interaction system, comprising:
a portable user device having:
a first screen configured to display a primary image;
a second screen configured to display a secondary image; and
a processor for controlling the display of the images, wherein the first screen and the second screen are relatively positioned so that a composite image of the primary image and the reflection of the secondary image is formed on the first screen;
said composite image including the primary image having an additional visible element added thereto or revealed by virtue of the reflection of the secondary image thereon.

2. The portable video interaction system of claim 1, further comprising a plurality of controls for interacting with the composite image.

3. A portable video system, comprising:
a portable user device having:
a processor;
a storage containing a video image;
a first display;
a second display;
a first display system configured to provide a primary image on the first display;
a second display system configured to provide a secondary image on the second display; and
an image control system configured to control the selection of images for display by, the first display control system and the second display control system;
wherein the first display and the second display are relatively positioned so that a reflection of the secondary image combines with the primary image so as to form a composite image;
said composite image including the primary image having an additional visible element added thereto or revealed by virtue of the reflection of the secondary image thereon.

4. The portable video system of claim 3, wherein the image control system is configured to receive user inputs.

5. The portable video system of claim 4, wherein the image control system is configured to compare received user input with predetermined values.

6. The portable video system of claim 3, wherein any two or more of the first display system, second display system, and image control system are portions of an integrated system.

7. The portable video system of claim 3, further comprising a display piece positioned between the first display screen and the second display screen and configured to affect the composite image.

8. The portable video system of claim 7, wherein the display piece causes the reflection of the secondary image to be magnified.

9. The portable video system of claim 7, wherein the display piece causes the reflection of the secondary image to be reduced in size.

10. The portable video system of claim 7, wherein the display piece causes the reflection of the secondary image to be refracted.

11. The portable video system of claim 7, wherein the display piece causes the reflection of the secondary image to be filtered.

12. The portable video system of claim 3, further comprising a display piece containing a masked image positioned between the first display screen and the second display screen such that the primary image and the secondary image cause the masked image to be more visible.

13. A video interaction system comprising:
a portable user device having:
a first display device and a second display device, wherein each of the display devices is capable of presenting a primary image and a composite image including at least a reflection of some portion of the primary image on the other display device;
a processor configured to execute video applications; and a video application configured to be executed by the processor to present an interactive experience, the video application further configured to supply images to the composite image display capability;

said composite image including an additional visible element added thereto or revealed by virtue of the reflection of the primary image thereon.

14. The system of claim 13, wherein the video application is configured to increase the visibility of an obscured component of one of the primary images.

15. The system of claim 13, wherein the video application is configured to make visible a composite image consisting of portions of the primary image from each display device.

16. The system of claim 13, wherein the video application is configured to incorporate an element into the interactive experience, that element being part of the composite image on one of the display devices but not the primary image of that display device.

17. The system of claim 13, wherein the relative positions of the first display device and the second display device can be adjusted.

18. The system of claim 17, further comprising a stabilizing component configured to maintain a particular relative position of the first display device and the second display devices.

19. The system of claim 17, further comprising an alignment system configured to facilitate adjusting the relative positions of the first display device and the second display device so that the composite image is meaningful in the context of interactivity with the video application.

20. The system of claim 19, wherein the alignment system is configured to require user input.

21. The system of claim 19, wherein the alignment system is configured to not require any user input.

22. A user experience modification system, comprising a portable user device having:
    a first computing system configured to present a user with an interactive user experience;
    a primary display device configured to display images as directed by the first computing system and with which the user interacts;
    a secondary display device;
    a second computing system configured to cause images to be displayed on the secondary display device based at least in part on information made available by the first computing system;
    wherein, in operation, the primary display device and the secondary display device are positioned such that a composite image is formed on the primary screen, the composite image being formed from the images displayed on the primary display device and a reflection of the image displayed on the secondary display device;
    said composite image including the image on the primary display device having an additional visible element added thereto or revealed by virtue of the reflection of the image displayed on the secondary display device thereon.

23. A method for generating a composite image, comprising:
    storing a video having a plurality of images;
    selecting a first image from the images;
    selecting a second image from the images, the second image being different from the first image;
    displaying the first image on a first screen of a portable computing device;
    displaying the second image on a second screen of the portable computing device;
    reflecting the second image onto the first screen to form a composite image;
    said composite image including the first image having an additional visible element added thereto or revealed by virtue of the reflection of the second image thereon.

24. The method of claim 23, wherein the composite image is viewable on the first screen.

25. The method of claim 23, wherein the composite image is viewable on a third display component.

26. The method of claim 23, further comprising adjusting the position of at least one of the first screen, the second screen, and a user so that the composite image is viewable to the user.

27. The method of claim 23, further comprising adjusting the position of at least one of the first image on the first screen and the second image on the second screen, so that the composite image is viewable.

28. The method of claim 23, wherein the composite image is formed by the juxtaposition of the reflection of the second image with the first image.

29. The method of claim 23, wherein the composite image is formed by the composition of the reflection of the second image with the first image.

30. The method of claim 23, wherein the first image comprises a masked component and a mask component and the reflection of the second image complements the mask component.

31. The method of claim 23, wherein the reflection of the second image comprises a masked component and a mask component and the first image complements the mask component.

32. A method comprising:
    storing a video having a plurality of images;
    selecting a first image from the images;
    displaying the first image on a first screen of a portable user computing device;
    reflecting at least a portion of the first image onto a second screen of the portable user computing device to form a composite image;
    said composite image including an image of the second screen having an additional visible element added thereto or revealed by virtue of the reflection of the first image thereon.

33. The method of claim 32, further comprising adjusting the relative position of the first screen and the second screen so that a preferred portion of the first image can be reflected onto a preferred region of second screen.

34. The method of claim 32, further comprising adjusting the position of the first image on the first screen so that a preferred portion of the first image can be reflected onto a preferred region of second screen.

35. The method of claim 32, further comprising: selecting a second image from the images and displaying the second image on the second screen.

36. The method of claim 35, further comprising adjusting the position of the second image on the second screen so that a preferred portion of the first image can be reflected onto a preferred portion of the second image.

37. The method of claim 35, wherein the computing device is configured to present an interactive video experience, and at least one of the selecting or display steps is based at least in part on the state of the interactive video experience.

38. The method of claim 37, wherein the interactive video experience is a video game.

39. A computer-readable device storing computer executable instructions for a portable video game device having a plurality of displays, that when executed performs the method of:
- selecting a first image for display on a first display of a portable user computing device;
- displaying the first selected image;
- selecting a second image for display on a second display of the portable user computing device; and
- displaying the second selected image;
- wherein the images are selected so that when they are simultaneously displayed and the displays are appropriately positioned, a composite image of the images is formed via reflection of the first image on the second image;
- said composite image including the second image having an additional visible element added thereto or revealed by virtue of the reflection of the first image thereon.

* * * * *